(12) United States Patent
Schubring et al.

(10) Patent No.: US 11,731,073 B2
(45) Date of Patent: Aug. 22, 2023

(54) APPARATUS AND METHOD FOR SOLVENT RECOVERY FROM DRYING PROCESS

(71) Applicant: Durr Systems, Inc., Southfield, MI (US)

(72) Inventors: Nathan Schubring, Oconto, WI (US); Andreas Keil, Munich (DE); Jeffrey Quass, Green Bay, WI (US)

(73) Assignee: Durr Systems, Inc., Southfield, MI (US)

( * ) Notice: Subject to any disclaimer, the term of this patent is extended or adjusted under 35 U.S.C. 154(b) by 82 days.

(21) Appl. No.: 17/458,791

(22) Filed: Aug. 27, 2021

(65) Prior Publication Data

US 2021/0387132 A1 Dec. 16, 2021

Related U.S. Application Data

(62) Division of application No. 16/508,482, filed on Jul. 11, 2019, now Pat. No. 11,130,091.

(51) Int. Cl.
*B01D 53/04* (2006.01)
*B01D 53/26* (2006.01)

(52) U.S. Cl.
CPC ..... *B01D 53/0423* (2013.01); *B01D 53/0438* (2013.01); *B01D 53/0446* (2013.01)

(58) Field of Classification Search
CPC .. B01D 53/002; B01D 53/04; B01D 53/0423; B01D 53/0446; B01D 53/265; B01D 5/0003; B01D 5/0027; B01D 5/0057; B01D 2253/108; B01D 2256/10; B01D 2257/704; B01D 2258/0216; Y02E 60/10; Y02P 70/10

USPC ............................................. 96/132; 95/141
See application file for complete search history.

(56) References Cited

U.S. PATENT DOCUMENTS

| 3,274,755 | A | 9/1966 | Montagnon et al. |
| 4,946,479 | A | 8/1990 | Izumo |
| 5,701,762 | A | 12/1997 | Akamatsu et al. |
| 9,403,122 | B2 | 8/2016 | Geckeler |

(Continued)

FOREIGN PATENT DOCUMENTS

CA 2214542 A1 3/1998

OTHER PUBLICATIONS

International Preliminary Report on Patentability dated Jan. 11, 2022 in corresponding PCT application No. PCT/US2020/041154.

(Continued)

*Primary Examiner* — Frank M Lawrence, Jr.
(74) *Attorney, Agent, or Firm* — Nields, Lemack & Frame, LLC (57) ABSTRACT

Method and apparatus for condensing a majority of the solvent in a process gas stream at low temperatures, e.g., below the freezing point of water, ca. −5° C. The gas stream exiting the condenser step may be further processed in one or more emission control devices, such as a single or multi-step series of concentrator devices, such as zeolite concentrator devices. One or more emission control operations can be carried out downstream of the single or multi-step concentrators. The aforementioned condensing process enables the one or more concentrators to operate in a favorable temperature range for removal of 99% or more of VOC, thereby meeting or exceeding strict environmental regulations.

12 Claims, 5 Drawing Sheets

(56) References Cited

U.S. PATENT DOCUMENTS

| | | |
|---|---|---|
| 11,130,091 B2 | 9/2021 | Schubring et al. |
| 2011/0056220 A1 | 3/2011 | Caggiano |
| 2021/0008488 A1 | 1/2021 | Schubring et al. |
| 2022/0152520 A1* | 5/2022 | Schubring ............ B01D 5/0027 |

OTHER PUBLICATIONS

International Search Report and Written Opinion dated Nov. 25, 2020 in corresponding PCT application No. PCT/US2020/041154.
Asahi Research Center Co., "VOC Emission Control, Manual of Voluntary Measures Regarding Industrial Cleaning", Ltd., Mar. 2007.
Khan et al., "Removal of Volatile Organic Compounds from Polluted Air", Journal of Loss Prevention in the Process Industries, vol. 13, No. 6, pp. 527-545, Nov. 1, 2000.
"Sky-Save VOC Concentrator", Seibugiken Products, 6 pages, published prior to Jul. 11, 2019.
"Tombo Brand SolventClean", Nichias Corporation, 12 pages, published prior to Jul. 11, 2019.

* cited by examiner

APPARATUS AND METHOD FOR SOLVENT RECOVERY FROM DRYING PROCESS

This application is a divisional of U.S. patent application Ser. No. 16/508,482 filed Jul. 11, 2019, the disclosure of which is incorporated herein by reference in its entirety.

BACKGROUND

In the manufacture of lithium ion batteries and the like, a wet coating may be applied to a substrate in a slurry or paste form and is composed of fine powders mixed with a binder material, typically a polymer which may be water-soluble. In some cases, the binder is dissolved in an inorganic solvent such as N-methyl-2-pyrrolidone (NMP), acetone, various alcohols or similar industrial solvent selected to dissolve the organic binder to form a coatable liquid. These web-based products may be coated on at least one face (side) of the substrate web. In these cases, a wet coating is applied continuously or discontinuously on a moving web and dried in an oven or dryer to remove solvent thereby solidifying the applied coating. Throughout this application a continuously applied coating shall be understood as applying a coat to a substrate, like a web, foil, or the like in continuous process with or without timely and/or locally varying coating parameters (e.g. thickness, chemical composition and/or physical parameters of the coating material, etc.), whereby this continuous process shall also include the coating in regular or irregular patterns on a substrate continuously moved through the coating process.

In certain cases, the aforementioned web-based products are coated on both faces (side) of the substrate web. In typical cases wherein both faces of the substrate web are to be coated, a first web coating is applied continuously on a moving web and dried in an oven or dryer followed by application of a second wet coating which is subsequently dried in a second drying step.

In a preferred embodiment for production of battery electrodes, the wet slurry is applied to both sides of the foil web and subsequently dried in an oven or dryer. This arrangement is referred to as simultaneous dual-side coating and drying. In the case of lithium ion electrode manufacture, this arrangement is particularly advantageous in enhancing productivity, needing only one drying step following application of the wet coating slurry to both side.

Recovery of VOC solvent emissions from these and other industrial process, such as solvents condensable at operating temperatures of typical chilling systems (e.g., N-methyl-2-pyrrolidone (NMP) and triethyl phosphate, dimethylacetamide (DMAc)), or other condensable fluids from an industrial operation such as the manufacture of lithium ion battery electrode, or drying and curing of polymeric films typically involves condensing the volatile organic compounds (VOC) along with water and other potential contaminants in low temperature coils having finned surfaces and additional mist removal devices. In the case of many useful solvents such as NMP, the concentration exiting the condenser operation is well above accepted limits for discharge into the atmosphere. In addition, recovery of such solvents may be cost-effective and desirable. Hence additional downstream emission control operations (emission control devices) are generally necessary to reduce the VOC concentration to permissible levels. VOC capture and or destruction methods include thermal (catalytic and straight thermal) oxidizers, scrubbers, carbon adsorption and adsorption on concentrator medias such a zeolite. Acceptable emission concentrations for VOC discharge to atmosphere are typically in the range of 10 to 20 $mg/Nm^3$ as carbon.

Current market conditions for the production of green energy goods such as electrodes for batteries demand a much lower concentration level of VOC emissions, on the order of 1 to 2 $mg/Nm^3$. Conventional emission control devices are impractical choices in reaching these low levels. Moreover, energy consumption is high for most of the conventional emission control methods and some or all of these devices as currently configured in the marketplace are incapable of reaching such low outlet emission concentrations. VOC capture operations with condensing coils require extremely low temperatures to reach equilibrium vapor pressures necessary to emit sufficiently low VOC concentrations exiting the condensing unit. For instance, with NMP in the incoming air stream, in order to reach 1 $mg/Nm^3$ in the effluent stream the condensing coils would need to run with coil surface temperatures below $-35°$ C. Most drying processes also include water vapor in the dryer exhaust along with the VOC species. Such temperature conditions often result in freezing of water on the coil fins and tubes building ice, which eventually blocks the airflow passages between tubes and the fins in the heat exchange core of condensing coil thereby requiring a thawing to melt and remove the ice blocking the coil. In order to operate continuously, some systems may be arranged with two or more condensing coil sets in parallel. Additional valves, heaters and air moving hardware are provided such that one or more condensing coil path is on line in condensing operation mode while at least one condensing coil path is isolated from the effluent flow path and is operating in thaw mode. Issues of reliability and energy efficiency often plague such systems to the point they are avoided altogether.

Accordingly, an apparatus and method of reducing or eliminating such VOCs that does not suffer from the drawbacks of the prior art would be highly beneficial.

SUMMARY

Problems of the prior art have been addressed by embodiments disclosed herein, which provide a method and apparatus for overcoming the limitations of the prior art in an innovative and useful way by condensing a majority of the solvent in a process stream at low temperatures (e.g., even below the freezing point of water, ca. $-5°$ C.) compared to conventional thermal coil condensers. The remaining solvent in the gas stream may be below 50 $mg/Nm^3$ owing to the low temperature condensing step. In this temperature range solvents such as NMP or DMAc exhibit anti-freeze behavior depressing the freezing point of the water-solvent mix thus avoiding buildup of ice. In certain embodiments, the gas stream exiting the condenser step is further processed in one or more emission control devices, such as a single or multi-step series of concentrator devices, such as zeolite concentrator devices. The aforementioned condensing process enables the one or more concentrators to operate in a favorable temperature range resulting in the removal of 90 to 99% or more of VOCs, thereby meeting or exceeding strict environmental regulations.

Concentrator flow capacity per given volume of adsorbent media is generally higher at lower removal percentages and is reduced at higher removal percentages. Therefore the optimal design point for percentage removal of VOC's for a particular solvent laden air stream in each stage being handled with two or more emission control devices in series, the first being a concentrator type, may be in the lower portion of the range of 90 to 99% removal. In one example embodiment, a first step concentrator removes≥90% of VOC, leaving less than 10% of the incoming amount, e.g., leaving 5 mg/Nm³ when the incoming amount is 50 mg/Nm³. An optional second step concentrator device also removes≥90% of the incoming VOC from said first step concentrator. The resulting exit concentration is therefore on the order of about 0.5 mg/Nm³, meeting strict environmental regulations, including the new goals of the battery industry, for example.

Accordingly, certain embodiments disclosed herein relate to a circulation air conditioner such as for a recirculating air dryer or dryers generating circulation air laden with at least one condensable fluid (such as NMP), the circulation air conditioner comprising:

at least one main condenser having a feed port and an exhaust port and at least one main condensation stage, comprising:
  i. a condensation chamber being accessible by or permeable for the circulation air, and
  ii. a cooling coil at least partially arranged inside said condensation chamber and permeated by a cooling medium,
  iii. whereby the cooling coil of said main condenser is operated with a main cooling medium temperature of 0° C. or less,
b. a circulation air feed line being connected to said feed port of said main-condenser and being connectable to a source of condensable fluid laden air such as an exhaust circulation air duct of said dryer or dryers for carrying the circulation air,
c. a circulation air exhaust line being connected to said exhaust port of said main condenser and being connectable to a feed circulation air duct of said dryer or dryers, and
d. a side-stream off gas extraction line being fluidly connected to at least said condensation chamber of said main condenser,
  i. whereby a volume flow of a circulation air streaming in said condensation chamber is split into a high volume re-circulation stream leaving the condenser through the circulation air exhaust line and a low volume off-gas side stream.

In certain examples, the side-stream and the re-circulation stream are split in volume by a split-ratio between 0.1% and 20%, preferably between 0.5% and 10%, and even more preferably between 1% and 5%.

In certain aspects, the circulation air conditioner may further comprise at least a pre-condenser with at least one pre-condensation stage that is placed in the circulation air stream upstream of the main condenser and comprises a pre-condenser condensation chamber being accessible by or permeable for the circulation air, and a cooling coil at least partially arranged inside said pre-condenser condensation chamber and permeated by a pre-cooling medium, whereby the pre-cooling medium has a temperature higher than the main cooling medium temperature.

The pre-condenser and said main-condenser may be enclosed in a common condenser housing.

The circulation air conditioner of any of the foregoing embodiments, alone or in combination, may further comprise a pre-cooling heat exchanger arranged upstream of the pre-condensation stage or at least upstream the main condensation stage to already reduce a temperature of the streaming in circulation air and/or a reheating heat exchanger being arranged downstream of the main condensation stage. The pre-cooling heat exchanger and the re-heating heat exchanger may be thermally coupled by the exchange of a heat transfer medium such as water, brine or suitable thermal fluid and/or thermally coupled by a thermocouple or heat pipe. In some examples, the pre-cooling heat exchanger and the re-heating heat exchanger are in addition or alternatively thermally coupled via at least one thermocouple or heat pipe.

The circulation air conditioner of any of the foregoing embodiments, alone or in combination, may further comprise an air pollution control unit fluidly connected to the side-stream off gas extraction line and having at least one adsorptive concentrator with a gas exhaust and a desorption exhaust as a first pollution control stage and at least a second pollution control stage being selected from the group consisting of a filtration device, an absorptive concentrator, a thermal oxidizer, and a catalytic device. The second pollution control stage may comprise an adsorptive concentrator that is feed by the gas exhaust of the first pollution control stage and having a gas exhaust and a desorption exhaust. The desorption exhaust of at least one of the adsorptive concentrators may be connected to a desorption line, which is connected to a desorbate condenser, whereby a gas exhaust of the desorbate condenser is fed back into the side-stream off gas extraction line. The second pollution control stage may comprise at least one activated carbon filter.

In its method aspects, embodiments disclosed herein relate to a method for conditioning a circulation air laden with at least one condensable fluid, comprising:
  a. providing the circulation air at a first volume flow and intake temperature level well above 0° C. to a main condenser with at least one main condensation chamber;
  b. gradually cooling the circulation air to a main temperature level of 0° C. or less inside the main condensation chamber;
  c. splitting the volume flow of the circulation into a high volume re-circulating flow and low volume off-gas side stream after reaching the second temperature level; and
  d. providing the high-volume re-circulating flow to a circulation air intake of a dryer.

In certain aspects, the method may further comprise providing a condenser to cool the circulation air according to step b), which comprises at least one cooling coil filled with a cooling medium, and whereby the cooling medium enters the coiling coil at the far end side of an circulation air entry with entry temperature of 0° C. or less and is heated while traveling through the cooling coil in a counter-flow direction to the circulating air. The flow and temperature of the entering cooling medium are preferably measured with a suitable flow meter device and temperature sensor such as a resistance temperature detector (RTD) respectively. The circulating flow may be driven by a fluid pump in communication with the fluid entry connection of the cooling coil. Further, the temperature of the air exiting the cooling coil is preferably measured with an array of one or more temperature sensors spaced across the cross-section of the exit face of the coil. Said air temperature sensors may be, for example, RTD's or thermocouples. The temperature of the entering cooling media may be controlled to a pre-determined set point by a suitable PID controller in control communication with a valve and actuator positioned in the conduit from the chilled brine source, typically a water-cooled or air-cooled centrifugal chiller. A three-way flow path valve set allows fresh cooling media from the cooling media source to enter the circulating flow path through the coil while heated cooling media in fluid communication with the cooling media return connection is discharged back to the cooling media source. Alternatively, the temperature of the air exiting the cooling coil may be controlled to a pre-determined set point by a second suitable PID controller in control communication with a valve and actuator positioned in the conduit from the chilled brine source. In a most preferred embodiment the output from said exit air temperature measurement and controller are configured to calculate by control algorithm the temperature set point for the entering cooling media control loop which is transmitted in a cascade control arrangement between the two respective PID controllers. In some embodiments, the controller may have a processing unit and a storage element. The processing unit may be a general purpose computing device such as a microprocessor. Alternatively, it may be a specialized processing device, such as a programmable logic controller (PLC). The storage element may utilize any memory technology, such as RAM, DRAM, ROM, Flash ROM, EEROM, NVRAM, magnetic media, or any other medium suitable to hold computer readable data and instructions. The controller unit may be in electrical communication (e.g., wired, wirelessly) with one or more of the operating units in the system, including one or more of the valves, actuators, sensors, etc. The controller also may be associated with a human machine interface or HMI that displays or otherwise indicates to an operator one or more of the parameters involved in operating the system and/or carrying out the methods described herein. The storage element may contain instructions, which when executed by the processing unit, enable the system to perform the functions described herein. In some embodiments, more than one controller can be used.

The method of any of the forgoing embodiments, alone or in combination, may still further comprise feeding the circulation air at the first volume flow to a pre-condenser upstream said main-condenser with a pre-condensing temperature level below a first temperature level and well above said main condensing temperature; gradually cooling the circulation air to said pre-condensing temperature level in the pre-condenser; and providing the cooled circulation air to an intake of said main condenser. The circulation air may be pre-cooled upstream of said main condenser, and/or may be reheated downstream of said main condenser.

The method of any of the forgoing embodiments, alone or in combination, may still further comprise feeding the off-gas side stream to an at least two-stage air pollution control device; collecting and increasing the concentration of residual condensable fluid in an adsorptive concentrator as a first pollution control stage; and subsequently treating the remaining off gas stream in a second air pollution control device as a second stage further downstream of the first stage to a level of concentration of residual condensable in the air well below a predetermined limit, such as 1 mg/Nm³. The second air pollution control device may be a second adsorptive concentrator or a filtration device, such as an active carbon filter.

By operating a single or multi-stage condenser in combination with one or more emission control devices, such as two VOC concentrator wheels in series, the target emission of <1 mg/Nm3 is obtainable. In some embodiments, recovery of VOC solvents results in elimination of nearly all VOC waste products to the environment without requiring thermal combustion products or other secondary pollutants. Valuable solvents such as NMP may be recovered and purified for reuse in the battery electrode manufacturing process in a closed-loop fashion, for example.

BRIEF DESCRIPTION OF THE DRAWINGS

The embodiments disclosed herein may take form in various components and arrangements of components, and in various process operations and arrangements of process operations. The drawings are only for purposes of illustrating preferred embodiments and are not to be construed as limiting. This disclosure includes the following drawings.

DETAILED DESCRIPTION

A more complete understanding of the components, processes and apparatuses disclosed herein can be obtained by reference to the accompanying drawings. The figures are merely schematic representations based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawing, and are not intended to define or limit the scope of the disclosure. In the drawing and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

All ranges disclosed herein are inclusive of the recited endpoint and independently combinable (for example, the range of "from 2 inches to 10 inches" is inclusive of the endpoints, 2 inches and 10 inches, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "upper" and "lower"

are relative to each other in location, i.e. an upper component is located at a higher elevation than a lower component, and should not be construed as requiring a particular orientation or location of the structure. As a further example, the terms "interior", "exterior", "inward", and "outward" are relative to a center, and should not be construed as requiring a particular orientation or location of the structure.

The terms "top" and "bottom" are relative to an absolute reference, i.e. the surface of the earth. Put another way, a top location is always located at a higher elevation than a bottom location, toward the surface of the earth.

The terms "horizontal" and "vertical" are used to indicate direction relative to an absolute reference, i.e. ground level. However, these terms should not be construed to require structures to be absolutely parallel or absolutely perpendicular to each other.

Figure 1:
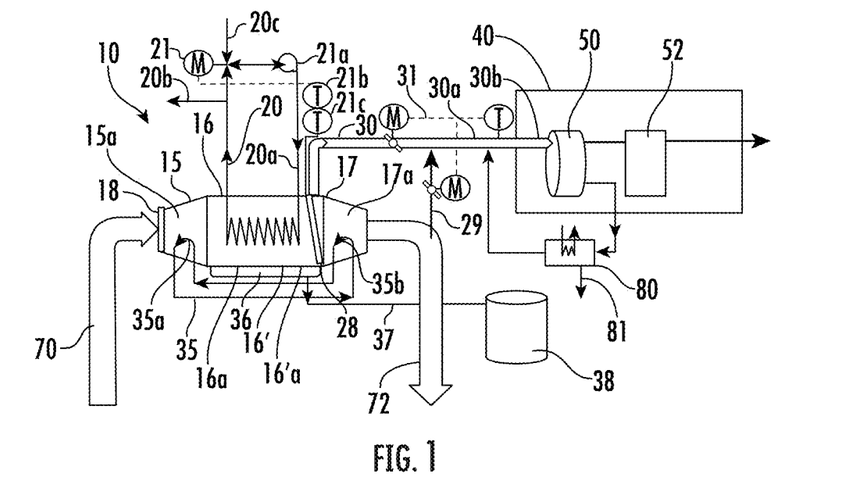
FIG. 1 is a schematic diagram of an exemplary single-stage condenser and downstream emission control apparatus in accordance with certain embodiments.
Figure 2:
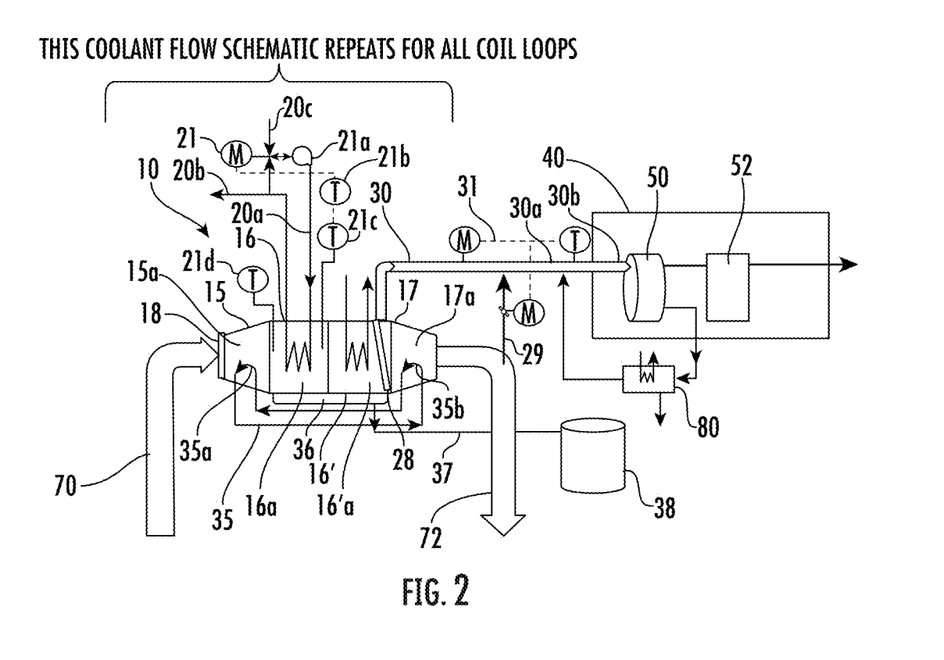
FIG. 2 is a schematic diagram of an exemplary multi-stage condenser and downstream emission control apparatus in accordance with certain embodiments.

Turning now to FIGS. 1 and 2, where like numerals indicate like parts, there is shown a condenser 10 having a feed port 12 and an exhaust port 14 spaced from the feed port 12. In the embodiments shown, the entry of condenser 10 has optionally an air particulate removal filter 18, one or more pre-cooling regions 15, each having a pre-cooling chamber 15a; one or more cooling or condensing regions or stages 16, downstream of the one or more pre-cooling regions 15, each having a condensing chamber 16a; a mist coalescing panel (i.e., a demister) 28, and one or more re-heating regions 17, downstream of the one or more cooling or condensing regions 16, each having a re-heating chamber 17a. Each of the aforementioned chambers is accessible by or permeable for the circulation of air. In certain embodiments, the cooling or condensing region 16 may be a single stage condenser (FIG. 1), or may comprise multiple cooling stages (FIG. 2), each effective to further cool the entering gas stream to a temperature lower than the temperature to which the gas stream was cooled in the cooling stage immediately upstream of it.

In some embodiments, there are two cooling or condensing regions 16, 16' (FIG. 2). In some embodiments, there are three, four, five or more condensing regions (not shown). The number of condensing regions depends in part on the properties of the VOC's and how gradual the VOC-laden process stream should be cooled to avoid fog formation; i.e., it is at least in part a function of the rate of temperature drop or temperature cooling profile of the VOC's.

In certain embodiments, each cooling or condensing region or stage 16 may include a condensation chamber 16a having a cooling coil 20 arranged therein, through which a cooling medium may be circulated. Suitable cooling media are not particularly limited, and include water and brines, such as water mixed with propylene and/or ethylene glycol. Each cooling coil 20 may be partially or completely arranged within its respective cooling or condensing region 16. As shown in FIG. 1, preferably the flow of cooling media through the cooling coil 20 is in a counter-flow direction to the flow of process gas through the condensation chamber 16a.

Alternatively, a spray condenser could be used where the coolant is sprayed in the condensation chamber by one or more nozzles to condense the VOC's in the process stream.

Figure 3:
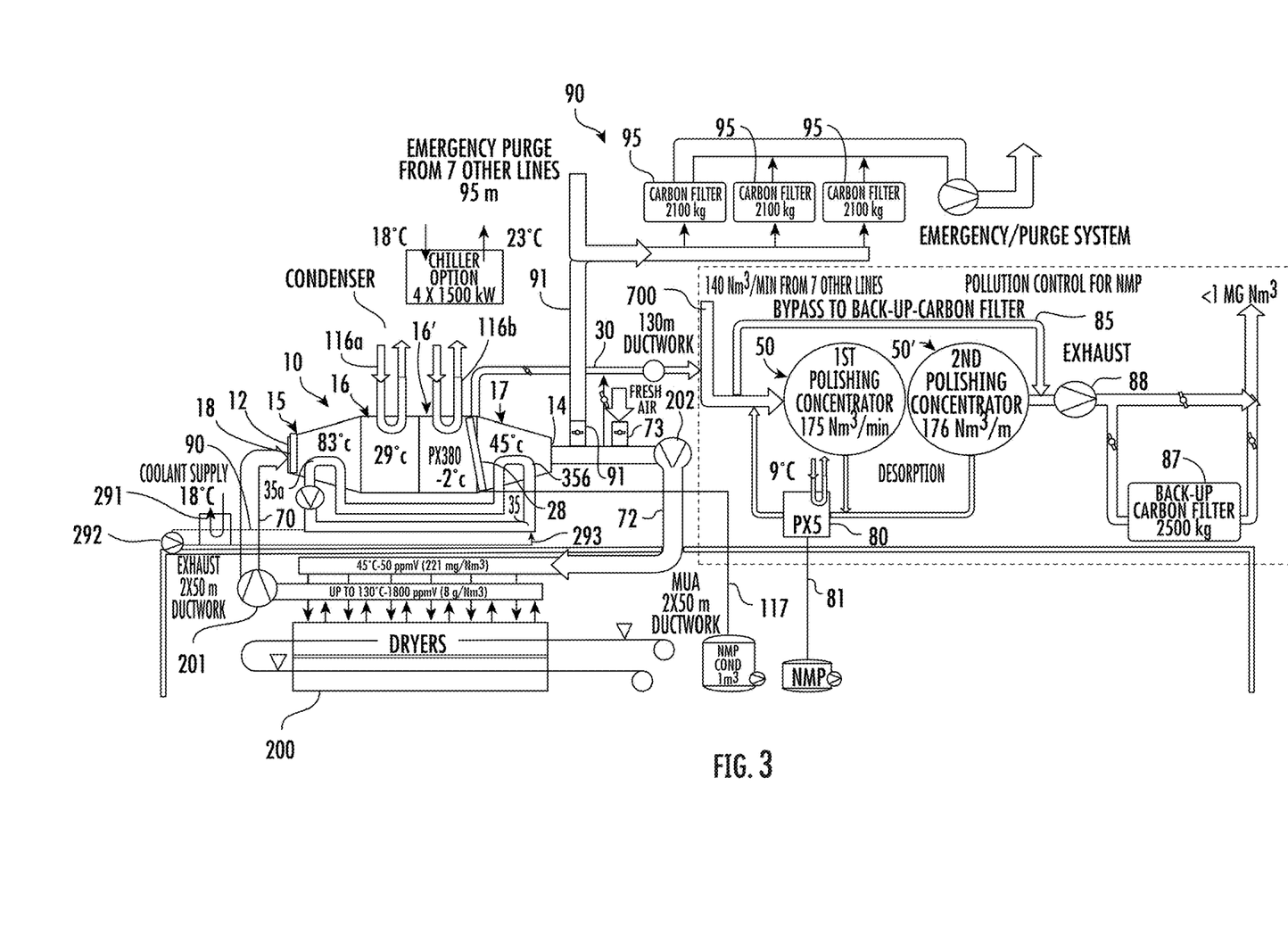
FIG. 3 is a process diagram of a first exemplary process in accordance with certain embodiments.
Figure 4:
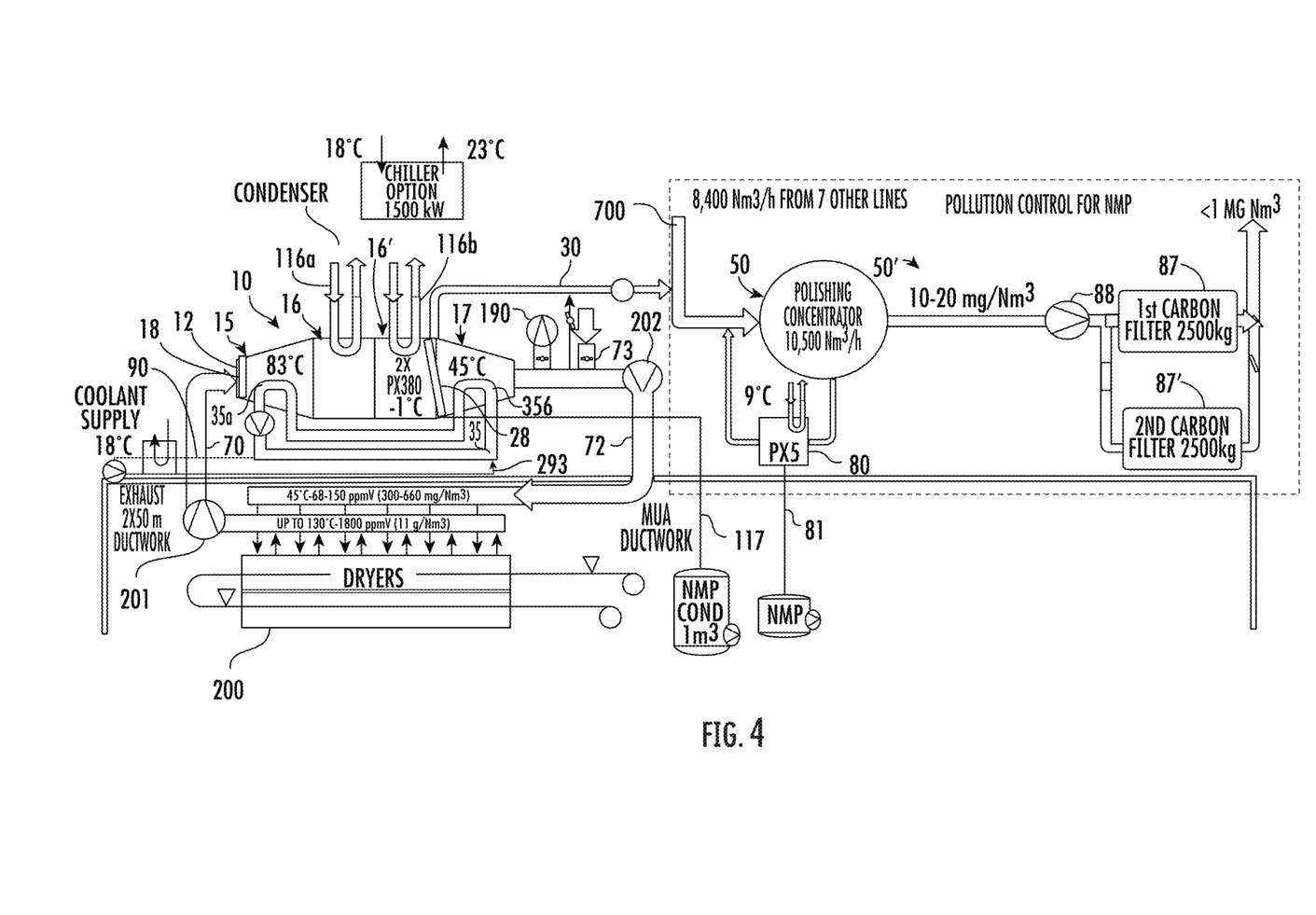
FIG. 4 is a process diagram of a second exemplary process in accordance with certain embodiments.
Figure 5:
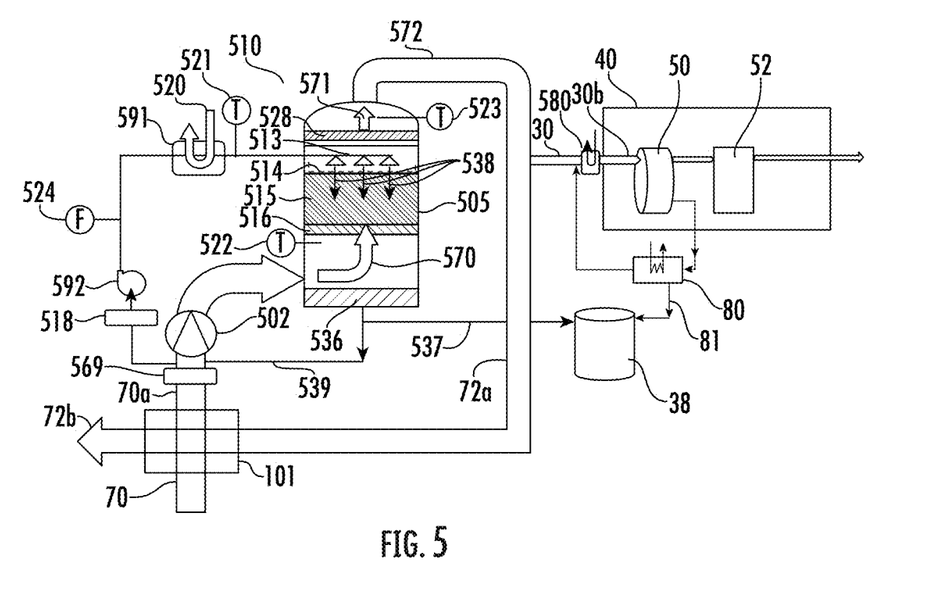
FIG. 5 is a schematic diagram of a direct contact condenser operation in accordance with certain embodiments.

Alternatively still, as shown in FIG. 5, a direct-contact condenser 510 could be arranged in place of condenser 10 of FIGS. 1-4. Solvent-laden airflow 70 from a drying operation is directed to direct-contact condenser vessel 505 after precooling in economizer heat exchanger 101. The cooled stream 70a is optionally pre-filtered in air filter unit 569 and pressurized by blower 502 and blown into a port in the lower section of vessel 505. The solvent laden air 570 enters the lower chamber of 505 and is directed vertically through flow distributor 516 into a region of media packing 515. Flow distributor 516 includes structural elements to support the weight of the packing and weight of liquid adhering to the packing. Said packing may be selected for optimum surface contact area with the upward-flowing air stream per unit volume and for low pressure drop characteristics. Common packing shapes include Raschig rings, saddles, pall rings or other suitable packing shapes. The packing is generally of corrosion resistant material such as stainless steel, ceramic or polymeric materials. The solvent-laden air stream 570 passes through the packing media and directly contacts cooled condensed solvent flowing downward by gravity and wets the surfaces of the packing. Said cooled condensed solvent is fed to the upper portion of vessel 505 via flow distribution header 513 and may optionally be further distributed by fluid tray 514 to evenly distribute the cooled solvent evenly across the horizontal cross section at the top of the packing 515. Cooled solvent 538 is used directly as condensing media by direct contact between solvent laden air stream 570 and the wetted surfaces of the packing media in the packing contact region 515. The cooled solvent trickles downward through the packing picking up condensed solvent from the counter flowing air eventually reaching the bottom of packing region 515 and drains through distributor 516 into the lower section of vessel 505 acting as a sump. The level of collected solvent 536 in said sump is maintained by a level sensor and control which directs solvent through conduit 537 to primary storage vessel 38.

The exit gas flow 571 passes through a demister element 528 and a majority of the flow travels through exhaust line 72a and is reheated in economizer 10 before being conveyed in conduit 72 to the dryer operation. The split ratio of flow conducted in conduit 30 is preferably in the range of 0.5% to 10% of the flow in exhaust line 572. During unsteady state operating conditions this split ratio can be as high as 20%. The flow in conduit 30 is preferably reheated by heat exchanger 580 to obtain a temperature of flow 30b entering the concentrator 50 between 10° C. and 20° C., most preferably 15° C.

It is to be appreciated that for direct contact condensation, the cooling and condensation surface is in effect the cooled solvent liquid acting as the cooling media as well wetting the surface of the packing and trickling downward countercurrent to the solvent-laden airflow. Having a lower vapor pressure than the solvent laden air, the cooled solvent picks up more solvent from the air as well as increasing in temperature from said air. Therefore in continuous steady state operation energy must be removed from the condensed solvent stream 539 by liquid-liquid heat exchanger 591. The temperature of the cooled solvent fed into the direct condenser must be measured and precisely controlled prior to distributing the cooled solvent into vessel 505 via feed manifold 513. A majority of the collected solvent in 536 in the sump region of 505 is directed through conduit 539 and optionally filtered in liquid filter 518 and further pumped by centrifugal pump 592 and cooled through liquid-liquid heat exchanger 591 and further conveyed to distribution header 513 near the top the tower vessel 505. The split ratio of the flow in conduit 537 is in the range of 5% to 30% of the flow in conduit 539. The flow rate in 539 is measures with a suitable liquid flow meter and controlled to a set point by a controller modulating the speed of motorized pump 592 by variable frequency motor speed control. The temperature of the cooled solvent is measured as it enters the distributor manifold 513 by a suitable temperature element such as an RTD and controlled to a set point temperature, preferably in the range of −10 to 0° C., most preferably −4° C. by coolant brine source 520 in exchanger 591. An actuated flow control valve in the coolant flow conduit from brine source 520 is modulated to obtain a desired measured temperature feeding the distributor 513. Said temperature set point is sufficiently cool such that the vapor pressure of the solvent in the gas phase exiting the packing region 515 results in a concentration level of solvent in stream 571 in the range of 1 to 500 mg/Nm3, preferably 1 mg/NMP in the case of NMP.

Figure 1A:
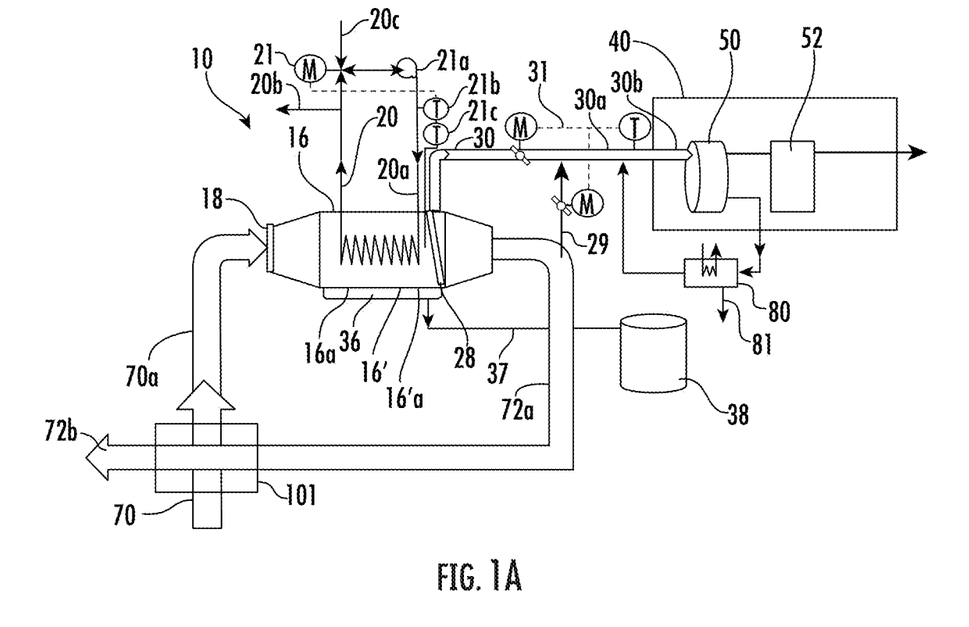
FIG. 1a is a schematic diagram of an exemplary single-stage condenser and downstream emission control apparatus in accordance with an embodiment including an air-to-air economizer.

In certain embodiments, the pre-cooling region 15 and the re-heating region 17 may be brought and/or maintained at their respective operating temperatures with a pre-cooling heat exchanger and a re-heating heat exchanger. In certain embodiments, these heat exchangers are a closed loop heat exchange recirculation system 35 which may function as an economizer. The recirculation system 35 may include a first coil 35a at least partially arranged inside the pre-cooling chamber 15a and a second coil 35b at least partially arranged inside the pre-heating chamber 17a. The loop 35 may contain a suitable heat exchange medium such as water or brine to transfer heat to and/or from the process gas in the pre-cooling and pre-heating regions. An air-to-air economizer heat exchanger 101 also could be used as shown in FIG. 1a. Exhaust flow 70 from the drying operation is precooled in economizer 101 by the cooler temperature return air flow in exhaust line 72a. The economizer 101 is selected to provide thermal exchange effectiveness in the range of 40 to 60% resulting in temperature of flow 70a at the proper pre-cooled temperature value in the range of 80 to 100° C. Accordingly, the exhaust return air 72a is reheated with energy from exhaust 70 to a desired temperature in the range of 40 to 60° C. in the economizer 101. The temperature of the heat exchange medium optionally may be regulated with the aid of a further heat exchanger 291 as shown in FIG. 3. In certain embodiments, the temperature of the coolant in the recirculation loop 35 is higher than the temperature of the coolant in the coil or coils in the condensation region 16. Excess thermal energy may be removed to control the temperature of the coolant in recirculation loop 35 by circulating a portion of the coolant from loop 35 via pump 292 through a liquid-liquid heat exchanger 291, in a split ratio range of 10 to 50% of the flow through 35. The portion of fluid thus cooled is returned in conduit 293 to 35 before entering 35b.

In certain embodiments, the pre-cooling region 15 and the condenser region 16 have a common housing. In certain embodiments, the condenser region 16 and the re-heating region 17 have a common housing. In certain embodiments, the pre-cooling region 15, the condenser region 16 and the pre-heating region 17 have a common housing.

In some embodiments, a pre-cooling heat exchanger 35a may be arranged upstream of the pre-cooling region to reduce the temperature of the streaming in circulation air. In some embodiments, a re-heating heat exchanger 35b may be arranged downstream of the condensation region 16. In some embodiments, both heat exchangers may be so arranged. The pre-cooling heat exchanger and the re-heating heat exchanger may be thermally coupled by the exchange of a heat transfer medium such as water, brine or suitable thermal fluid.

In certain embodiments, a side-stream off gas extraction line 30 may be provided in fluid communication with the condensation region 16. Where multiple condensation regions 16 are provided, the side-stream off gas extraction line is preferably in direct fluid communication with the furthest downstream condensation chamber 16a; i.e., the chamber immediately upstream of the re-heating region 17. The side-stream gas extraction line 30 may be configured to communicate with a downstream unit operation, such as one or more VOC concentrators and/or one or more emission control units as discussed in greater detail below. A portion of side-stream off-gas may also be extracted following the re-heating region through conduit 29 and added to the side-stream flowing in extraction line 30. Temperature control loop 31 comprised of a temperature sensor and controller positioned to measure the mix temperature of flows from extraction lines 29 and 30 and modulate actuated flow dampers in flow lines 29 and 30. Thus an optimum temperature in the range of 10 to 18° C., preferably 15° C. may be obtained and controlled by closed-loop control of flow proportioning as the flow 30b enters the concentrator 50. A circulation air exhaust line 72 may be provided in fluid communication with the exhaust port 14 of the condenser 10. The circulation air exhaust line 72 may be configured to connect to a feed circulation air duct of one or more industrial dryers (FIG. 3), for example. The split flow proportion flowing in conduit 30a is preferably in the range of 0.5% to 10% of the flow in exhaust line 72. During unsteady state operating conditions this split ratio can be as high as 20%.

In some embodiments, the feed port 12 of the condenser 10 is in fluid communication with, or is adapted or configured to be in fluid communication with, the exhaust from one or more industrial dryers 100 (FIG. 3), such as by a circulation air feed line 70. That is, the source of the process gas to the condenser 10 may be the exhaust from one or more industrial dryers, such as one or more dryers drying coating on a web. For example, in battery electrode manufacturing, a wet process is used to apply battery electrode components to a current collector web of copper or aluminum foil, for example. Typically a polymer binder, graphite, and an active material are mixed with a solvent, or water, and applied to a web. The solvent or water is driven off in one or more dryers to produce a dry battery electrode material for use in a battery cell. The exhaust from such a dryer or dryers is a suitable feed stream to the condenser 10.

In some embodiments, the exhaust port 14 of the condenser 10 is in fluid communication, or is adapted or configured to be in fluid communication, with a recirculation feed to one or more industrial dryers 100 (FIG. 3), such as by a circulation air exhaust line 72. A suitable driving force, such as a suction fan arranged in the recirculation line 72, may be used to drive the flow of process gas into and through the condenser 10.

The dryer or dryers 100 may be a conventional convection air web dryer such as where hot air is used to dry a coating on a web travelling through the dryer. For example, air bars or nozzles may be used to direct a jet of air to impinge on the surface of a material to carry out heat and/or mass transfer functions. Convection air drying of battery electrode materials is typically carried out with drying air temperatures in the range of 80 to 160° C. and air nozzle convection heat transfer coefficients to the web from 30 to 100 watts/ $m^{2\circ}$ C. per side of web. As is known to those skilled in the art, a plurality of air nozzles may be arranged in an array or multiple arrays to direct air impingement over a large surface of a material in web form, either on one side of the web, or both sides simultaneously. In some embodiments, the heat transfer to the web may be enhanced by addition of infrared emitters or emitting surfaces. Optimum temperatures for said emitting surfaces are in the range of 260 to 425° C. Web materials commonly processed in this manner include paper, plastic film, metal foils, woven and nonwoven fabrics and mats, and porous membrane materials. Flotation air bars are a type of air nozzle used in industrial dryers and ovens to floatingly support and convey a continuous web to be processed by thermal treatment, which may include any combination of drying, heating, curing or cooling of the web. A coating is applied to the surface of the web or a volatile material is present within the base web material which must be dried and/or heated to a particular temperature so as to facilitate thermal curing of a polymer material in the coating. In many processes the volatilized materials within the web or coating after being liberated from the web surface are carried away from that surface by the spent nozzle air and conducted by an air handling system to an exhaust. This exhaust is then directed into the condenser 10 in accordance with certain embodiments.

Alternatively, the dryer may be a so-called "inert" dryer, in which the dryer interior contains an inerting gas such as nitrogen in order to limit the oxygen content (e.g., to 2% or less) of the dryer atmosphere to, for example, reduce the possibility of explosion. Said nitrogen may be vaporized from liquid nitrogen storage tanks or produced continuously from nitrogen generator systems having membrane separators or pressure swing adsorption modules.

Recovered condensate may be removed from the condenser 10 and stored in a suitable container 38. Each condensing stage 16 and 16a' and coalescing demister 28 are configured to drain condensed solvent by gravity to sump basin 36. Drain line 37 includes an air lock (s-trap or other suitable device) to prevent passage of air from condenser 10 to container 38 and vice versa.

In certain embodiments, the pre-heating stage(s) 15 of the condenser 10 functions as a pre-condenser; it is operated at a suitable temperature (and/or pressure) such that little or no VOC's condense as the process gas flows through the one or more pre-heating chambers 15a.

Most preferably the cooling coil 20 in the condenser stage 16 is operated so that the gas exiting condenser chamber 16a has a main temperature of 0° C. or less. In some embodiments, where multiple condenser stages 16 are used, the cooling coil arranged in the stage furthest downstream is operated such that the chamber in which it is arranged has an exit temperature of 0° C. or less, such as at 0° C., −1° C., −2° C., −3° C., −4° C., −5° C., or down to −20° C. in cases where the anti-freeze behavior due to solvent in the solvent-water mix is favorable against freezing and ice formation in the condensing coil. For such low temperature condensing it is especially important the cooling coil(s) be arranged in the one or more upstream condenser stages and operated such that their respective chambers have higher temperatures such that only a small portion of the VOC's in the upstream stages are condensed.

It is a goal of each condenser coil design and operating condition to maximize condensation with wetting of solvent on the tube and finned surfaces to promote capture and gravity drainage. Rapid cooling of the solvent laden air below equilibrium vapor pressure of the solvent promotes the formation of tiny droplets within the bulk air stream as it travels between condensing coil tube and finned surface. After nucleation, said tiny droplets tend to remain very small with negligible further condensation and growth owing to the Kelvin effect. Accordingly, in order to reduce or eliminate deleterious fogging, in certain embodiments the rate of cooling is carefully controlled so as not to cool the VOC-laden stream too rapidly. Fogging, or the formation of very small droplets (generally on the order of 1 micron or less) of liquid, is problematic in that it involves the formation of tiny droplets that tend to become entrained in the air flow, thus hindering their removal or recovery. Indeed a significant fraction of such aerosol droplets pass through demister panels as well as pass through the core of the condenser coil. As a result, fog or aerosol formation results in the undesirable loss of product. In embodiments where the VOC includes NMP such as in lithium battery electrode production, for example, these tiny droplets of NMP end up being returned to the dryer(s), which is highly undesirable. Accordingly, the pre-cooling region(s) 15 and the condensation region(s) 16 should be operated such that gradual cooling of the process stream takes place so as to avoid fog formation.

For purposes of cooling rate characterization and quantification, the residence time of the solvent laden air while within the core of a particular condensing coil (i.e. while undergoing cooling) is made on a superficial volume basis. That is, the volume space occupied by the tubes and fins within the overall dimensions of the core is ignored in calculating the superficial residence time. The specific volumetric airflow Q through the coil is expressed in normal cubic meters per unit time. The coil face area and depth in the flow direction are used to calculate the volume V in cubic meters. Therefore the superficial residence time in the core is determined as $t=V/Q$. Further, the temperature drop DT in Centigrade degrees (note this parameter is a temperature difference value, not an absolute temperature value) of the air and solvent driven by the cooling coil may be measured directly in operation or calculated from supplier sizing data in the design phase. Finally the rate of cooling R may be expressed as $R=DT/t$. For example, a cooling coil core has a face area of 4.5 square meters and a flow path depth of 0.3 meters. The specific volumetric airflow is 25,000 $Nm^3/h$. Therefore the residence time may be calculated as $t=(4.5\times 0.3)\ m^3/25,000\ m^3/hr=5.4\times10^{-3}$ hr. Converting to milliseconds $t=5.4\times10^{-3}$ hr$\times$3,600,000 millisec/hr=194 milliseconds. If the air temperature entering the coil is 56° C. and the exiting temperature is 28° C. the cooling rate $R=DT/t=(56°$ C.$-28°$ C.$)/194=0.144$ C degrees per millisecond.

For NMP capture with minimal fog formation in the condensing coil regions where condensation of solvent is occurring while the gas flow travels the distance between the condensing coil tubes and finned surfaces, the rate of cooling should be less than 0.30 C degrees per millisecond, preferably between 0.15 and 0.22 C degrees per millisecond. Typical design criteria for organic solvents such as DMAc with water vapor for minimal fog formation in the condensing coil regions where condensation of solvent is occurring while the gas flow travels the distance between the condensing coil tubes and finned surfaces the rate of cooling should be less than 0.3 C degrees per millisecond, preferably between 0.12 and 0.2 C degrees per millisecond. In most cases the acceptable maximum cooling rates for a particular solvent must be determined by experiment.

In operation the method of precise control of the cooling rate may be illustrated in reference to FIG. 2 for exemplary case of coil 16a. This same method is applicable to a plurality of cooling coils represented as 16' within a condensing plenum 10. It is to be understood that the circulating flow loop and controls described below shall apply to additional coils in like manner. All such flow loops shall include and the temperature control circuits and hardware shown for coil 16a.

The flow and temperature of the cooling medium 20a entering the coil 16a are preferably measured with a suitable flow meter device and temperature sensor such as a resistance temperature detector (RTD) respectively. The circulating flow is driven by a fluid pump 21a in communication with the fluid entry connection of the cooling coil 16a. Further, the temperature of the air entering the cooling coil is preferably measured with an array of one or more temperature sensors 21d spaced across the cross-section of the entry face of the coil and the temperature of the air exiting the cooling coil is preferably measured with an array of one or more temperature sensors 21c spaced across the cross-section of the exit face of the coil. Said air temperature sensors may be RTD's or thermocouples. The temperature of the entering cooling media is measured and controlled to a pre-determined set point by a suitable sensor and PID controller 21b in control communication with a valve and actuator 21 positioned in the conduit 20c from the chilled brine source, typically a water-cooled or air-cooled centrifugal chiller. An actuated three-way flow path valve 21 allows fresh cooling media from the cooling media source 20c to enter the circulating flow path through the coil while heated cooling media in fluid communication with the cooling media return connection 20b is discharged back to the cooling media source. Alternatively, the temperature of the air exiting the cooling coil is controlled to a pre-determined set point by a second suitable PID controller 21c in control communication with a valve and actuator 21 positioned in the conduit from the chilled brine source. In a most preferred embodiment, the output from said exit air temperature measurement and controller 21c is configured to calculate by control algorithm and transmit in a cascade control arrangement said temperature set point to the entering cooling media control loop 21b.

In certain embodiments, once the process gas flow from the condenser region 16 has reached 0° C. or less and VOC condensation is complete or substantially complete, the gas flow is divided into a relatively high volume recirculation gas flow (e.g., line 72) and a relatively low volume off-gas side stream (e.g., extraction line 30). In the example shown in FIG. 3, those volumes are split by a split-ratio of approximately 2%.

In certain embodiments, the blend of off-gas side stream extraction lines 29 and 30 combining into 30a is adapted or configured to be placed in fluid communication with one or more downstream emission control operations 40. For example, the emission control operation may include at least one adsorptive concentrator with a gas exhaust and a desorption exhaust, such as one or more VOC adsorptive concentrators 50 used to concentrate the VOC's extracted by the condenser 10. The type of VOC concentrator(s) used is not particularly limited, and may be rotation type gas adsorption concentration devices. For example, honeycomb rotors may be used to support the VOC adsorbent media, and the rotor may be divided into at least an adsorption zone and a desorption zone. The solvent-laden air to be processed is passed through the adsorption zone, where the VOC's are adsorbed by the adsorbent media (e.g., zeolite). The VOC's can then be desorbed, such as by passing heated air through the desorption zone. In some cases, such concentrators may include a rotor wheel having an adsorbent substrate such as a hydrophobic zeolite, or a combination of adsorbents. The rotor wheel may be rotated continuously, and the airstream passes through the rotor wheel concentrator where VOC's are stripped from the air and adsorbed onto the adsorbent substrate. The majority of this now clean air may then be exhausted to atmosphere. A small portion of the air stream may be heated to an elevated temperature to be used as desorption air. Continuous rotation of the wheel transports this air stream to the desorption region, where the VOC's are heated, desorbed and collected. Purge air may be used to cool the adsorbent media, and the now heated purge air can be recycled to the desorption region. Thus, the one or more adsorptive concentrator 50 may have a gas exhaust and a desorption exhaust and function as an emission or pollution control stage.

In certain embodiments, a single VOC concentrator 50 may be used. In other embodiments, two or more VOC concentrators 50 may be used, arranged in series. In some embodiments, one or more further emission or pollution control stages 52 may be used downstream of the one or more VOC concentrators 50, such as one or more filtration devices (e.g., activated carbon based filtration devices), absorptive concentrators, thermal oxidizers (e.g., regenerative thermal oxidizers), catalytic oxidizers and/or biofilters.

Figure 6:
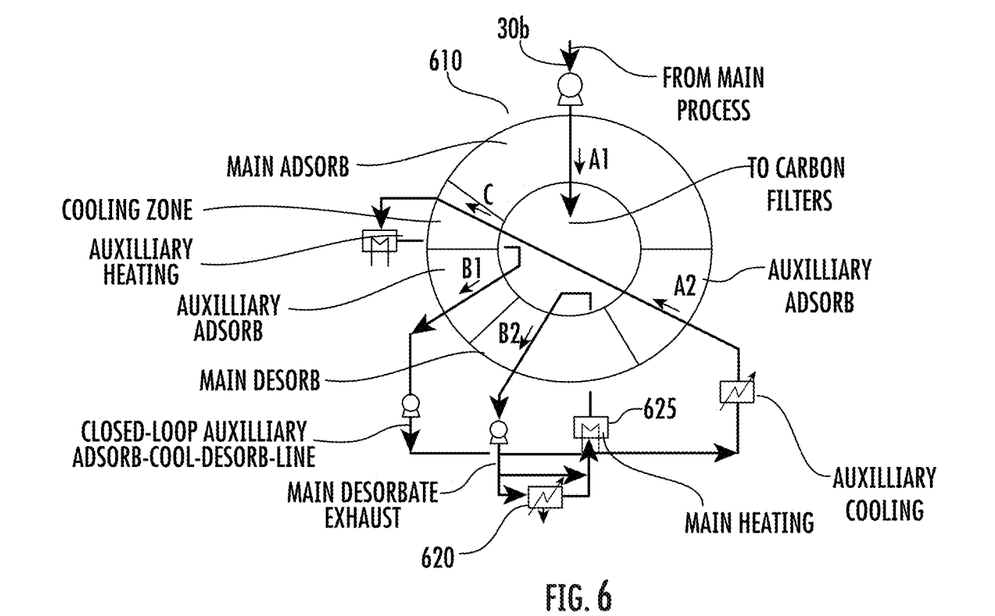
FIG. 6 is a schematic view of a multi-stage adsorption/desorption unit.

In some embodiments, a two-stage air pollution control unit 500 as shown in FIG. 6 may be arranged downstream of the condenser 10, such as the pollution control unit disclosed in JP 2011-031159. The unit includes an organic solvent recovering device wherein an adsorbing body comprising an adsorbing element containing an adsorbent is constituted of at least an adsorbing region, a regeneration region and a cooling region. The organic solvent-containing gas (e.g., the gas in the side-stream 30 from the concentrator 10) is continuously supplied to the adsorbing region of the adsorbing body, the adsorbing element adsorbing the organic solvent in the adsorbing region, and is sent to the regeneration region to desorb the adsorbed organic solvent from the adsorbing element by a heated gas. The organic solvent-containing gas is again adsorbed in the adsorbing region by the regenerated adsorbing element, and a condensing part for recovering the organic solvent desorbed in the regeneration region is provided. A backup treatment device capable of performing continuous adsorbing and desorbing treatment of the organic solvent-containing treated gas passed through the adsorbing region without being adsorbed is provided, and is constituted so that the continuous solvent adsorbing and desorbing treatment is performed in the adsorbing region and the regeneration region by the adsorbing element formed into a columnar or cylindrical shape.

FIGS. 3 and 4 illustrate exemplary embodiments of the operation of a condenser and emission control apparatus. In an exemplary embodiment as shown in FIG. 3, an exhaust gas stream 70 containing VOC's, such as NMP, that is exiting one or more dryers 200 may have a temperature generally between about 80-130° C., more typically between about 120-130° C., and may have a solvent concentration generally between about 500-3000 ppmV, more typically between about 1800-2500 ppmV. In the embodiment shown, the concentration of solvent in the exhaust stream is 1800 ppmV and the temperature is 130° C. A driving force such as a fan 201 may be used to cause the exhaust stream to enter the feed port 12 of a condenser 10. Alternatively or in addition, a suction fan 202 may be placed downstream of the condenser exhaust port 14.

Consistent with the objective of gradually reducing the temperature of the exhaust gas stream, it first enters a pre-cooling region 15 of the condenser 10, the region 15 having a coil 35a with a cooling medium having a temperature sufficient to lower the temperature of the gas stream to about 83° C. The residence time of the gas stream in the pre-cooling region should be sufficient to allow the temperature of the stream to cool to the desired value, such as 83° C. Since no condensation is occurring in this stage, cooling rates in the range of 0.6 C degree per millisecond or more are acceptable. Preferably the conditions in the pre-cooling region 15 are such that little or no solvent condensation occurs. The gas then flows into a first cooling or condensing stage 16, where it is cooled by a coil 116a containing a cooling medium having a temperature sufficient (e. g., 18° C.) to lower the temperature of the gas steam to 29° C. In this stage most of the heat exchange is sensible heat and although little condensation of solvent occurs in this stage the cooling rate is critical in this early stage of condensing solvent. Cooling rates not to exceed the range of 0.15 to 0.30 C degree per millisecond are preferred. The cooled gas then flows into a second cooling or condensing stage 16', or main condensing stage, equipped with a coil 116b containing a cooling medium having a temperature sufficient (e.g., −10° C.) to lower the temperature of the gas stream to equal to or less than 0° C.; e.g., −2° C., where significant phase change occurs, and all or substantially all of the remaining solvent condenses. Again, in this stage the cooling rate is critical as in this early stage of condensing solvent. Cooling rates not to exceed the range of 0.15 to 0.30 C degree per millisecond are preferred. This gradual cooling of the gas stream helps minimize or prevent deleterious fog formation. In addition, causing the cooling fluid in the coils 116a, 116b to flow from the downstream side to the upstream side (i.e., in the direction opposite to the direction depicted in FIG. 3) can reduce fog formation.

A major portion of the gas then flows into the re-heating region 17, which in the embodiment shown has a coil 35b containing a cooling medium having a temperature sufficient to raise the temperature of the gas stream to 45° C., after which it is recirculated to the one or more dryers 200 via exhaust line 72. Ambient air may be added to the exhaust line 72 as shown at 73.

A minor portion (e.g., by mass flow balance equivalent to the flow of gas entering into web slots in the one or more dryers) of the gas flow is extracted from the cooling or condensing stage 16' via a side-stream off gas extraction line 30. In the example shown in FIG. 4, the volumes of the re-circulation air stream and the off gas side-stream are split by a split-ratio of approximately 1.1%. It is preferred that this extraction be carried out upstream of the pre-heating region 17, since the relatively low temperature of this extracted stream raises the efficiency of a downstream concentrator. A portion of the gas in the re-heating region 17 may be extracted in conduit 29 and mixed with the gas in the side-stream off gas extraction line 30 extracted from the second cooling or condensing region 16'. The amount of gas that has been re-heated in region 17 that is mixed with the gas in the side-stream off gas extraction line can be blended with temperature controller and damper system 31 to regulate the temperature of the gas entering a downstream concentrator (or other downstream emission control apparatus) to optimize the performance of the downstream unit, such as regulating the gas in the side-stream off gas extraction line 30 to a temperature of about 10-20° C., preferably about 16-18° C. NMP can be recovered from the condenser 10 via line 117 and stored as shown.

Thus, the condenser apparatus 10 can be used to produce a feed stream to a downstream emission control unit or units, such as one or more VOC concentrators, the feed stream being at an optimum temperature for the performance of the emission control unit or units. Off-gas side stream flows extracted from a plurality of condenser apparatuses equivalent to condenser apparatus 10 may be preferably combined in common duct 700 and fed to a single VOC polishing concentrator system as shown in in FIGS. 3 and 4. This allows for better capacity matching of the side stream flows from a large operation having for instance 8 or more condensing apparatuses. Combination of the off-gas side stream flows results in improved economy of scale for the VOC polishing operation.

The gas in the side-stream off gas extraction line enters a first VOC polishing concentrator 50 which contains an adsorbent such as a zeolite or carbon. This first concentrator 50 typically removes from about 90-99% of the VOC's (e.g., NMP) from the gas stream. The adsorbed VOCs may be then desorbed by reheating, and may be directed to a cooling or desorbant condenser 80 or the like and recirculated back to the inlet stream to the first VOC polishing concentrator as shown. VOC condensate may be collected from the condenser 80 via line 81 and stored or recycled to the coating process.

In the embodiment shown, the concentrated gas stream next enters a second VOC polishing concentrator 50', which also typically removes from about 90-99% of the VOC's (e.g., NMP) remaining in the stream. In certain embodiments, the second VOC polishing concentrator 50' is identical to the first VOC polishing concentrator 50. The collected air stream may be condensed in the condenser 80 as shown.

A bypass line 85 may be provided to allow interruption of the concentrator units, the bypass line 85 directing the flow (e.g., with the aid of fan 88) to one or more back-up carbon filters 87, for example, so that the content of the VOC's exhausted to atmosphere does not exceed regulatory limits (e.g., <1 mg/Nm$^3$).

An emergency purge system 90 is provided, which includes purge line 91 having a damper 92 that directs the flow of gas from the condenser 10 to one or more emission control units, such as one or more carbon filters 95.

FIG. 4, where like numerals indicate like parts to those described above, illustrates a similar process with only a single VOC polishing concentrator 50 being employed. In this embodiment, two carbon filters 87, 87' are arranged downstream of the single VOC polishing concentrator 50 in order to achieve the target VOC emission concentration of <1 mg/Nm$^3$. This embodiment also eliminates the emergency purge system 90, instead a purge fan 190 is fluidly connected to the exhaust line 72 as shown to provide an emergency purge.

As in the case of coil condensers 10, avoidance of fog formation in direct contact condensers 510 depends on gradual cooling of the solvent-laden air stream in the condensing region, that is within the height of packing 515. Cooling rate is first considered in the design selection of the volume of packing section 515. Condenser vessel 505 is preferably circular in cross-section. Alternatively it may be of square or rectangular cross-section in plan view in order to accommodate site layout requirements. Similar to the case of coil type condensers, the volume is determined on a superficial volume basis. That is, the volume space occupied by the packing within the overall dimensions of the packing region 515 is ignored in calculating the superficial residence time. The specific volumetric airflow Q through the coil is expressed in normal cubic meters per unit time. The packing face area and depth in the flow direction are used to calculate the volume V in cubic meters. Therefore the superficial residence time in the core is determined as $t=V/Q$. Further, the temperature drop DT in Centigrade degrees (note this parameter is a temperature difference value, not an absolute temperature value) of the air and solvent driven by the cooling coil may be measured directly in operation or calculated from supplier sizing data in the design phase. Finally the rate of cooling R may be expressed as $R=DT/t$. For example, a direct-contact condenser vessel has a face area of 4.0 square meters and a packing height of 1.5 meters. The specific volumetric airflow is 25,000 Nm$^3$/h. Therefore the residence time may be calculated as $t=(4.0\times1.5)$ m$^3$/25, 000 m³/hr=2.4×10⁻⁴ hr. Converting to milliseconds t=2.4× 10⁻⁴ hr×3,600,000 millisec/hr=864 milliseconds. If the air temperature entering the packing is 83° C. and the exiting temperature is −4° C. the cooling rate R=DT/t=(83° C.−(−4)° C.)/864=0.1 C degrees per millisecond.

For NMP capture with minimal fog formation in the condensing packing regions where condensation of solvent is occurring while the gas flow travels the distance within the packing, the rate of cooling should be less than 0.20 C degrees per millisecond, preferably between 0.07 and 0.15 C degrees per millisecond. Typical design criteria for organic solvents such as DMAc with water vapor for minimal fog formation in the condensing coil regions where condensation of solvent is occurring while the gas flow travels the distance within the packing the rate of cooling should be less than 0.15 C degrees per millisecond, preferably between 0.05 and 0.12 C degrees per millisecond. In most cases the acceptable maximum cooling rates for a particular solvent must be determined by experiment.

In operation the method of precise control of the cooling rate may be illustrated in reference to FIG. 5 for exemplary case of packing 515. The flow meter 524 and temperature sensor 521 monitor flow rate and temperature of the cooled solvent medium entering the manifold 513. The circulating flow 539 is driven by a fluid pump 592 in communication with the fluid entry connection of the cooling coil 591. Further, the temperature of the air entering the packing 515 is preferably measured with an array of one or more temperature sensors 522 spaced across the cross-section of the entry face of packing, and the temperature of the air exiting the demister 528 is preferably measured with an array of one or more temperature sensors 523 spaced across the cross-section of the exit face of the demister. Said air temperature sensors may be RTD's or thermocouples. The temperature of the entering cooled solvent media is measured and controlled to a pre-determined set point by a suitable sensor and PID controller 521 in control communication with a valve and actuator positioned in the conduit 520 from the chilled brine source, typically a water-cooled or air-cooled centrifugal chiller. The measured air temperature drop of the air 522 entering the packing and the air 571 exiting the condensing tower is controlled to a pre-determined set point by a second suitable PID controller 523 in control communication with the variable frequency motor control driving pump 592. In this manner the target rate of temperature drop in the condensing unit 510 is controlled to 0.15 C degrees per millisecond for NMP for example.

FIG. 6 illustrates a different type of adsorption device to replace the single VOC polishing concentrator in FIG. 4. The main adsorption takes place on the path A1 through the first segment of a carousel-type adsorption concentrator 610. The desorption is done with reference to JP2011031159A. A main desorption cycle is performed by the path B2 with a condenser 620 and a heating coil 625 implemented. Additional the FIG. 6 shows a closed-loop auxiliary adsorption-cooling-desorption circle with the path '"A2" (adsorption)-"C" (cooling)-heating-"B1" (desorbing)-cooling'. This configuration has the advantage that the two circles can be operated under inert conditions (if necessary) and can lead higher desorption concentrations in the main desorption circle. As described in FIG. 4 additional carbon filter can be implemented before the gas is released to the stack. The described process is also possible with a disc-type concentrator.

While various aspects and embodiments have been disclosed herein, other aspects, embodiments, modifications and alterations will be apparent to those skilled in the art upon reading and understanding the preceding detailed description. The various aspects and embodiments disclosed herein are for purposes of illustration and are not intended to be limiting. It is intended that the present disclosure be construed as including all such aspects, embodiments, modifications and alterations insofar as they come within the scope of the appended claims or the equivalents thereof.

What is claimed is:

1. A method for conditioning a circulation air laden with at least one condensable fluid, comprising:
   a. providing the circulation air at a first volume flow and intake temperature level above 0° C. to a main condenser with at least one main condensation chamber;
   b. gradually cooling the circulation air to a main temperature level of 0° C. or less inside the main condensation chamber;
   c. splitting the volume flow of the circulation air into a high volume re-circulating flow and low volume off-gas side stream after reaching the main temperature level; and
   d. providing the high-volume re-circulating flow to a circulation air intake of a dryer.

2. The method according to claim 1, wherein the circulation air is cooled according to step b) with at least one cooling coil filled with a cooling medium, and whereby the cooling medium enters the coiling coil at the far end side of a circulation air entry with entry temperature of 0° C. or less and is heated while traveling through the cooling coil in a counter-flow direction to the circulating air.

3. The method according to claim 1, further comprising:
   a. feeding the circulation air at the first volume flow to a pre-condenser upstream said main-condenser with a pre-condensing temperature level below a first temperature level and above said main condensing temperature;
   b. gradually cooling the circulation air to said pre-condensing temperature level in the pre-condenser; and
   c. providing the cooled circulation air to an intake of said main condenser.

4. The method according to claim 2, further comprising:
   a. feeding the circulation air at the first volume flow to a pre-condenser upstream said main-condenser with a pre-condensing temperature level below a first temperature level and above said main condensing temperature;
   b. gradually cooling the circulation air to said pre-condensing temperature level in the pre-condenser; and
   c. providing the cooled circulation air to an intake of said main condenser.

5. The method according to claim 1, further comprising pre-cooling said circulation air upstream of said main condenser.

6. The method according to claim 1, further comprising re-heating said circulation air downstream of said main condenser.

7. The method according to claim 5, further comprising re-heating said circulation air downstream of said main condenser.

8. The method according to claim 1, further comprising:
   a. feeding the off-gas side stream to an at least two-stage air pollution control device;
   b. collecting and increasing the concentration of residual condensable fluid in an adsorptive concentrator as a first pollution control stage;
   c. subsequently treating the remaining off gas stream in a second air pollution control device as a second stage further downstream of the first stage to a level of concentration of residual condensable in the air below a predetermined limit.

9. The method of claim 8, wherein said predetermined limit is 1 mg/Nm³.

10. The method according to claim 8, wherein said second air pollution control device is a second adsorptive concentrator.

11. The method according to claim 8, wherein said second air pollution control device is a filtration device.

12. The method according to claim 11, wherein said filtration device comprises an active carbon filter.

* * * * *